United States Patent [19]

Hughes et al.

[11] Patent Number: 4,964,450
[45] Date of Patent: Oct. 23, 1990

[54] EXTENSION FOR TABLE SAW

[76] Inventors: James D. Hughes, P.O. Box 335; Bryan K. Bailey, Rte. 1, both of Brownsboro, Tex. 75756

[21] Appl. No.: 415,101

[22] Filed: Dec. 15, 1989

[51] Int. Cl.⁵ .............................. B27C 9/02
[52] U.S. Cl. .................... 144/287; 83/438; 83/701; 269/318; 403/296; 144/286 A
[58] Field of Search ............ 144/286 R, 286 A, 287; 269/318; 83/438, 701; 403/292, 296, 300, 306, 361

[56] References Cited

U.S. PATENT DOCUMENTS

| | | | |
|---|---|---|---|
| 1,864,840 | 6/1932 | Lehner | 144/287 |
| 3,315,716 | 4/1967 | Mytinger | 83/438 |
| 4,265,284 | 5/1981 | Taylor | 144/287 |

Primary Examiner—W. Donald Bray
Attorney, Agent, or Firm—Larry B. Dwight

[57] ABSTRACT

A removable extension for a circular table saw comprising a pair of removable arms extending outwardly coaxially with the existing arms and an adapter for supporting the material to be cut which fits over the existing fence for the table saw.

4 Claims, 1 Drawing Sheet

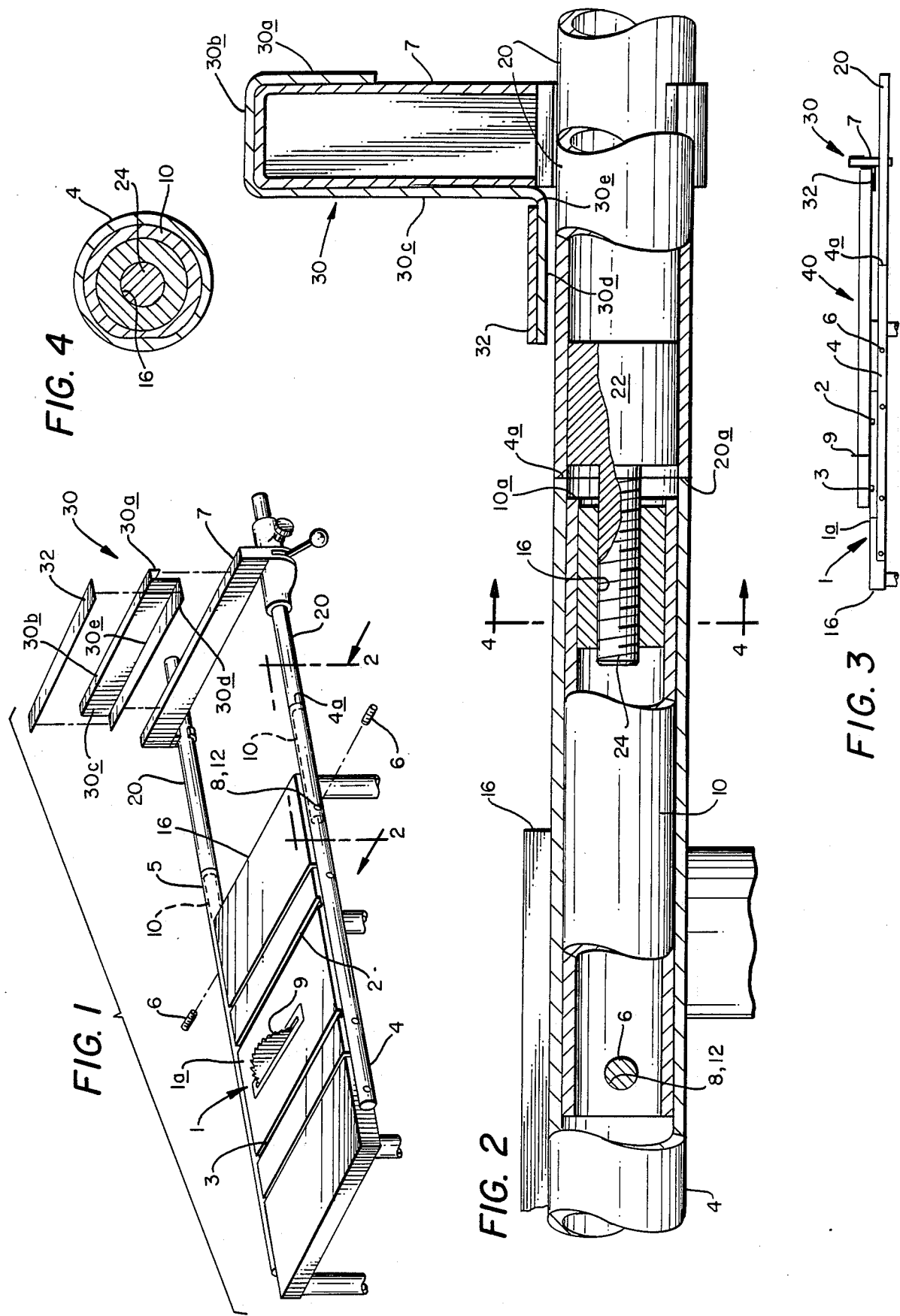

EXTENSION FOR TABLE SAW

FIELD OF INVENTION

The present invention relates to an extension for a table saw to lengthen the cutting distance.

CROSS REFERENCING

Reference is hereby made to disclosure document No. 219745 which applicant request be made a part of this file.

BACKGROUND OF THE INVENTION

Typically a circular table saw has a table on which the material being cut is moved into a circular cutting blade in order to cut the material which is typically wood. The material is generally moved along a guide or miter gauge to control the cut. Most saws have a maximum cutting width of approximately 24 to 25 inches which presents problems when attempting to cut material such as plywood which is 48 inches in width and 8 feet long. It becomes awkward to handle the material particularly for one man.

Extensions of table saw tops before have been comprised of components which are permanently bolted or fastened to the table top, making the saw awkward to store or transport.

Without an extended table when a width of greater than 24 inches of material is desired, it is necessary to try to calculate the material to be cut off rather than the width of the material to be cut. This often produces inaccurate results and one is still working on a table which is narrower than the material desired to be cut which makes it awkward to handle the material being cut which is greater than 2 feet.

SUMMARY OF INVENTION

The present invention is directed toward a removable extension to the table saw which may be attached and detached in a minimal amount of time to permit storage of the saw in a minimum area or to facilitate transportation of the saw when being used in remote locations.

The invention comprises a cylindrical adapter which fits inside the existing arm and is attached thereto and an extension rail which then attaches to the adapter to extend the existing arms to the desired length. Further, a table extender attaches over the existing fence on the table saw to support the outer edge of the material being cut when the saw is used in the extended position.

The primary object of the invention is to extend the usable width of the table saw to facilitate cutting unusually wide and cumbersome material such as plywood which is easily removable to permit storage and transportation of the saw.

A further object of the invention is to permit the cutting of the wider material in a safe manner.

A further object of the invention is to increase the accuracy in which the wider materials are cut.

Other and further objects of the invention would become apparent upon detailed studying of the drawings and specification annexed hereto.

BRIEF DESCRIPTION OF THE DRAWINGS

The following is a description of the drawings which are annexed hereto to form a portion of the description:

FIG. 1 is a perspective view from the top of a typical table showing the extended arms attached and the fence attachment exploded to more clearly view the invention, the remaining portion of the saw not being show;

FIG. 2 is an enlarged side view of the extension arm with parts broken away more clearly illustrate the attachment of the extender arm and showing the fence adapter attached to the fence;

FIG. 3 is an end view showing a typical operation of cutting the material on the invention; and FIG. 4 is a cross-sectional view taken along line 4—4 of FIG. 2.

Numeral references are used to designate like parts throughout the various figures of the drawings.

DESCRIPTION OF THE INVENTION

This invention is intended to use on a typical table saw such as those models manufactured by Rockwall International and others utilizing an arm on which the fence is guided along a table to control the width of the cut on a typical saw. A typical example of such a saw would be Rockwall International's Delta model 34-440 10 inch contractor saw in which the table is fixed and the arbor of the blade rotates to control the angle of cut on the material. Although this is a typical saw, there are many other models on which the invention may be used including saws in which the table tilts to control the angle of the cut and there are many other manufactures on which this invention is intended to be usable.

Referring to FIG. 1, a table 1 is shown detached from all other parts of the saw to more clearly illustrate the invention having a surface 1(a) with edges 1(b) and guide slots 2 and 3. Guide rails 4 and 5 are attached by screws 6 to the edges 1(b) of table 1 to permit the fence 7 to be moved along the table 1 to control the width of cut of the material.

Referring to FIGS. 1 and 2, the invention comprises an adapter 10 which is in this case tubular in shape having a hole 12 formed in one end of the adapter which will be axially aligned to receive fastening means such as bolt 6 through opening 8 in guide rail 4. The bolt 6 screws into a threaded aperture in the side of table 1. A threaded insert 14 having a female threaded hole 16 is secured in the end of the adapter 10 by welding or other means. The end 10(a) of adapter 10 is spaced inwardly from end 4(a) of guide rail 4 as will be further explained hereinafter. The arm extension 20 comprises a tubular pipe having a squared end 20(a) and being of the same diameter as guide rail 4. A connector 22 has a machined threaded end 24 or thread male stud formed thereon and is secured on the inside of extension arm 20 by welding or other means and is axially aligned to screw into threaded opening 16. Squared end of 20(a) is adapted to abut end 4(a) of guide rail 4 such that as the threaded end 24 is threaded and tightened into opening 16 of insert 14 by rotating extension arm 20 to turn threaded end 24 into threaded hole 16 the arm is squared and axially aligned with the axis of guide rail 4 and becomes a rigid extension thereof.

Likewise, an adapter 10 is inserted in guide rail 5 on the opposite side of the table and extension arm 20 is attached thereto to form two parallel extension arms 20 extending outwardly from guide rails 4 and 5 on opposite sides of table 1.

On the model table saw shown, the rails 4 and 5 are welded tubes and the adapter 10 has a flattened surface running the length of the adapter 20 to align with the welds and to align opening 12 with opening 8.

Thus, an axially aligned extension is formed extending the parallel surface of table 4. A movable fence 7 shown in FIGS. 1 and 3 moves along the guide rails 4 and 5 and after the extension arms 20 are placed thereon is moveable further outwardly. A material support means 30 is adapted to be placed over the fence 7 to support the edge of the material at the same height as table 1. The material support means 30 comprises a metal guide which has downwardly descending arm 30(a) a horizontally extended surface 30(b) which extends across the top of fence 7 a downwardly extending arm 30(c) which then extends into a horizontal surface 30(d). Arms 30(a) and 30(c) are formed to frictionally slip over guide 7. Surface 30(d) has a material guide plate 32 attached thereto by welding or other means which surface forms the same height as table 1. Plate 32 is attached thereto in order to permit the edge of the material to abut the downwardly extending arm 30(c) and not be held away by the corner 30(e) which due to mechanical bends is slightly rounded and would hold the material slightly off of the fence, thus causing an inaccurate cut.

As can be more fully shown in FIGS. 2 and 3, surface 32 is at the same height as surface 1(a) of table 1. A blade 9 extends upwardly from the table which is driven by a motor, not shown, to cut the material 40. Typically the material 40 has an edge which is extended against a movable fence 7 and in case of the figure shown surface 30(c) of the material support means and is moved in a parallel fashion in order to allow the blade 9 to cut the material to the desired width. In the case shown, the material is desired to be cut at a width of more than the width of guide rail 4 and extender arm 20 is attached to permit the material 40 to be moved along the upper surface 1(a) of table 1 and the surface 32 of the material support means 30 which is fitted over fence 7. This permits a wider piece of material may be cut.

Typically arms 20 may be inserted or removed by the operator depending on the width of material which he desires to cut and to facilitate the storage of the table saw or the movement thereof. Long arms on saws which have permanent tables attached create a problem in the movement of the saw in that the arms can be easily bent, and once they are must be replaced because they will not operate properly with the saw. Thus, by being able to remove the arms the likelihood of damage to the existing arms is reduced.

The invention as described is intended to be used with several models of circular table type saws having any of the affixed table or a tilting table to permit accurate and safe cutting of wider material.

It should be readily apparent from the detailed description heretofore given that other and further embodiments of the invention may be devised without departing from the spirit scope hereof.

Having described our invention, we claim:

1. A table extension for extending a table on a table saw having guide rails and a moveable fence comprising: adapter means connected to the existing guide rails of the table saw; extender arms having the cross sectional configuration the same as the guide rail; means connecting the extension arm and the adapter means to axially align the guide rails and the extender arm to extend the length of the guide rail on the table saw; and a material support means having a horizontal surface the same height as the table of the saw being adapted to slide over the existing fence so as to support the of the material being cut.

2. The combination called for in claim 1 wherein there adapter means comprises: a tubular member adapted to fit inside the guide rails, said tubular member having a threaded opening formed in one end which faces outward to receive the means connecting the extension arms and an opening formed transverse to the axis of the member at the opposite end to permit attachment to the guide rails.

3. The combination called for in claim 2 wherein the guide rails comprise hollow tubular members having an internal weld; and the tubular member has a flat surface formed along the length thereof which aligns with the weld on the guide means to line up the tubular member.

4. The combination called for in claim 1 wherein the means connecting the extender arms and adapter means comprises: a threaded stud extending outwardly from one end and axially aligned; a threaded opening formed in one end of the adapter means and axially aligned to receive the threaded stud; and the adapter means being spaced inwardly from the end of the guide rails such that the end of the extender arms meet the end of the guide rails.

* * * * *